Figure 1:
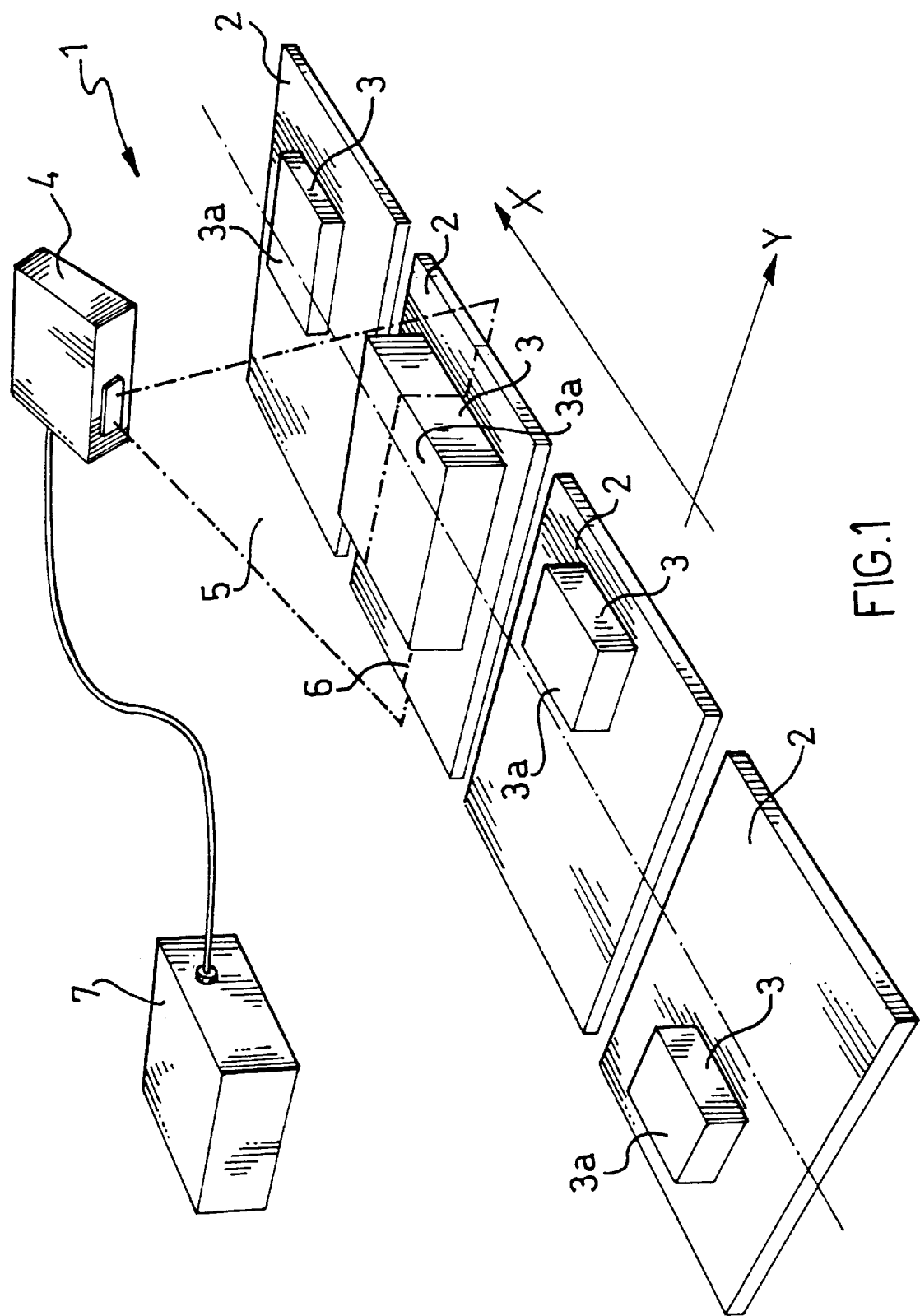

United States Patent [19]
Mazzone

[11] Patent Number: 6,102,291
[45] Date of Patent: Aug. 15, 2000

[54] APPARATUS AND PROCESS FOR DETECTING THE PRESENCE AND ENCUMBRANCE OF AN OBJECT

[75] Inventor: Claudio Mazzone, Crespellano, Italy

[73] Assignee: Datalogic, S.p.A., Bologna, Italy

[21] Appl. No.: 09/134,936

[22] Filed: Aug. 17, 1998

[30]      Foreign Application Priority Data

Sep. 17, 1997  [EP]  European Pat. Off. ............... 97830455

[51] Int. Cl.⁷ ................................................... G06K 7/10
[52] U.S. Cl. ............................... 235/462.01; 235/472.01; 235/462.23; 382/50
[58] Field of Search ....................... 235/462.01, 472.01, 235/983, 449, 454, 462.23; 282/50, 68, 65; 250/222.1, 205, 221

[56]              References Cited

U.S. PATENT DOCUMENTS

| 3,532,887 | 10/1970 | Clark . | |
| 4,656,343 | 4/1987 | Gerritsen et al. | 235/454 |
| 4,742,555 | 5/1988 | Tonkin | 382/50 |
| 5,475,207 | 12/1995 | Bobba et al. | 235/467 |
| 5,483,051 | 1/1996 | Marchi . | |
| 5,495,097 | 2/1996 | Katz et al. | 235/462 |
| 5,869,827 | 2/1999 | Rando | 235/462.4 |

FOREIGN PATENT DOCUMENTS 2021762   5/1979   United Kingdom .

OTHER PUBLICATIONS

R. Blaser "Fotoelectrische Abtastverfahren zum Erfassen von Oberflachen, Amessungen und Kennungen", ZWF Zeitschrift fur Wirtschaftliche Feertigung, vol. 59, No. 6, 1969, Muchen, Germany, pp. 283–287.

Primary Examiner—Thien M. Le
Attorney, Agent, or Firm—Sughrue, Mion, Zinn, Macpeak & Seas, PLLC

[57]              ABSTRACT

The apparatus of the invention consists of an ordinary laser scanner (such as for example those used for the reading of optical codes) in which the data obtained from the scanning are processed, for detecting the presence and the position, on a supply plane, of objects having heights even very different among themselves. The detection of the presence of an object, and its position, is carried out taking advantage of the luminous contrast between the surface of the same object and the bearing surface of the supply plane. The detection of the presence and the position of the object can be combined with the reading of an optical code positioned on the object. Furthermore, the use of a modulated light laser scanner, allows the implementation of the above mentioned operations with the measurement of the distance of the object from the same scanner, in this way calculating the overall encumbrance of the same object. This allows the optimization of distribution process and management of warehouses in the handling plants for the distribution and sorting of objects.

14 Claims, 6 Drawing Sheets

APPARATUS AND PROCESS FOR DETECTING THE PRESENCE AND ENCUMBRANCE OF AN OBJECT

DESCRIPTION

The present invention relates to an apparatus and a process for detecting the presence, the positioning and encumbrance of an object.

In the handling plants for the distribution and sorting of objects, the problem has arisen of detecting the presence of such objects on the conveyer belt or on the tray of a conveyance system. Often, it is useful to detect even their position (for example with respect to the central line of the conveyer belt) and their overall encumbrance, with the aim of optimizing the distribution process and the management of warehouses.

Such detecting operations are usually realized through optoelectric devices, such as photoelectric systems with a switch and/or blockage.

In fact, an advantage associated with such systems is that they are particularly economical. On the other hand, however, these do not provide satisfactory performances in cases where the object to be detected has small dimensions (typically flat objects or objects with reduced thickness) or in the case in which one wishes to examine the entire conveyance surface. Similarly, such systems are inadequate in all cases where one wishes to measure the overall encumbrance of objects present on the conveyer belt.

In such circumstances, it is necessary to use more complex and expensive devices, such as vision systems for example, or banks of photoelectric systems or optoelectric barriers.

The technical problem at the base of the present invention is to devise an economical and compact apparatus, capable of providing appropriate performances in the detection of objects of every type and dimension.

The present invention refers therefore, according to a first aspect, to an apparatus for detecting the presence and the position of an object on the bearing surface of a moving supply plane according to a feed direction, characterized in that it comprises:

a laser scanner, placed above the supply plane and activated in a scan plane intersecting the supply plane along a scan line;

a data processing unit connected to the scanner, the scanner in turn, comprising means for detecting the luminous contrast between a detection surface of the object and the bearing surface of the supply plane.

The apparatus of the invention therefore consists of a normal laser scanner (such as for example those used for reading optical codes, i.e. bar codes, two-dimensional codes, colour codes and so on) in which the data obtained from the scanning are processed and interpreted for detecting the presence and the position, on the supply plane, of objects having heights even very different among them.

As in the reading of a bar code, in which the luminous contrast between the clear area (spaces) and the dark area (bars) of codes is utilized, the detection of the presence of an object, and its position, is carried out utilizing the luminous contrast between the surface of the same object and the bearing surface of the supply plane. The identification of such luminous contrast along the scan line allows therefore the identification of the start and end points of a section of the object and therefore the presence and the position of the latter on the supply plane, regardless of the dimension and thickness of said object.

As the dimensions of the objects are much greater than the dimensions of the bars the spaces of optical codes, the processing of data obtained from scanning requires less computation resources than those normally required for the reading of optical codes.

Advantageously, the apparatus further comprises means for sending to the processing unit a signal every time the object moves on the supply plane of a pre-set feed distance. Therefore it is possible to repeat the scanning for a variety of sections of the object, in this way calculating the overall encumbrance (understood as occupied area) of the latter on the supply plane.

Even more advantageously, the scanner is a modulated light laser scanner. This kind of scanner (subject of U.S. Pat. No. 5,483,051 by the same applicant) allows the implementation of the above mentioned operations with the measurement of the distance of the object from the same scanner, in this way obtaining the height of the object too. The measurement of the distance becomes particularly useful for the calculation of the exact position and of the encumbrance of objects having various heights.

Preferably, the scanner is a scanner for the reading of optical codes positioned on the detection surface of the object. In this way it is possible to incorporate, through the use of a single scanner, information about the presence, the position of the object and the distance from the scanner, and other identifying information carried by the optical code, such as type of product, price, place of origin, destination, etc.

Overall, it is therefore possible, implementing a laser scanner of well-known type with appropriate electronics associated with a suitable computation card, to combine with the classic reading of optical codes the detection of the prospective presence and the position of an object on the supply plane. In the case where the scanner is of the modulated light type, it is also possible to calculate, in a simple and precise way, the overall encumbrance of such object, independently from the dimensions of the latter.

In a second aspect, the invention regards a process for detecting the presence and the position of a prospective object on the supply plane, comprising the following steps:

a) defining a bearing surface for the object associated with the supply plane, b) defining a feed direction of the object on the supply plane, c) defining a scan plane intersecting the supply plane along a scan line, d) sweeping the scan plane with a laser ray from a laser scanner, e) moving the object on the supply plane in the feed direction with respect to the scan plane until the scan line intersects the object in its detection surface, f) acquiring the data from at least one scanning of the object, g) processing the data obtained from such scanning in order to detect the luminous contrast between the detection surface of the object and the bearing surface.

Advantageously, the step of processing the data obtained comprises the following steps:

g1) generating a scan signal, in order to identify the beginning and end points of the scan line on the bearing surface, g2) detecting a first transition, corresponding to the beginning point of the object, g3) detecting a last transition, corresponding to the end point of the object, g4) determining the position of the object on the bearing surface calculating the distance respectively, between the first transition and last transition and the scan signal.

Such a process may be carried out through an apparatus derived from that normally used for the reading of optical codes (laser scanner), in which the data obtained from the scanning are interpreted in a way to detect the presence and position of the object on the supply plane. Such processing is particularly simple and does not require high computation resources.

Advantageously, the step of processing the data obtained further comprises the following steps:
amplifying the electric signal obtained from scanning,
taking the derivative of the amplified signal,
squaring the derivative signal in order to obtain a digital signal,
processing, through on appropriate software, the digital signal.

In a third aspect, the invention concerns a process for detecting the exact position of an object on the supply plane, comprising the following steps:
a) placing the object to be detected on a bearing surface associated with the supply plane,
b) defining a feed direction of the object on the supply plane,
c) defining a scan plane intersecting the supply plane along a scan line,
d) sweeping the scan plane with a laser ray from a modulated light laser scanner,
e) moving the object on the supply plane in the feed direction with respect to the scan plane until the scan line intersects the object in its detection surfaces,
f) acquiring the data from at least one scanning of the object,
g) processing the data obtained from such scanning in order to:
   g1) detect the luminous contrast between the detection surface of the object and the bearing surface of the supply plane,
   g2) measure the distance from the scanner of n points of the detection surface hit by the laser ray of modulated light,
   g3) select the minimum distance between the n measured distances,
   g4) calculate, based on such minimum distance, a transverse dimension, with respect to the feed direction, of the object.

The use of a modulated light laser scanner enables therefore to carry out a process, particularly simple and lacking complicated processing steps, for the calculation of the exact position, on the bearing surface, of objects having even very different heights among them.

In a fourth aspect, the invention concerns a process for detecting the encumbrance of an object on a supply plane, comprising the following steps:
a) placing the object to be detected on the bearing surface associated with the supply plane, such object comprising a detection surface which is substantially uniform,
b) defining a feed direction of the object on the supply plane,
c) defining a scan plane intersecting the supply plane along the scan line,
d) sweeping the scan plane with a laser ray from a modulated light laser scanner,
e) moving the object on the supply plane in the feed direction with respect to the scan plane until the scan line intersects the object,
f) acquiring the data from at least one scanning of the object,
g) processing the data obtained from such scanning in order to:
   g1) detect the luminous contrast between the detection surface of the object and the bearing surface of the supply plane,
   g2) calculate a transverse dimension, with respect to the feed direction, of the object,
   g3) move the object with respect to the scan plane by a pre-set feed distance in the feed direction on the supply plane,
   g4) calculate, for every transverse dimension, an elementary area of the detection surface of the object as a product of the calculated transverse dimension for the movement carried out,
   g5) repeat the steps e) to g4), until a luminous contrast is detected between the detection surface of the object and the bearing surface of the supply plane,
   g6) calculate the area of the detection surface 10 of the object as the sum of the calculated elementary areas.

The use of the modular light laser scanner allows therefore to carry out a process, particularly simple and lacking complicated processing steps, for the calculation of the encumbrance of objects having even very different heights among them.

Preferably, the above mentioned processes comprise further the step of reading an optical code positioned on the detection surface of the object, in order to univocally identify, from a dimensional and product perspective, the detected object.

Figure 3:
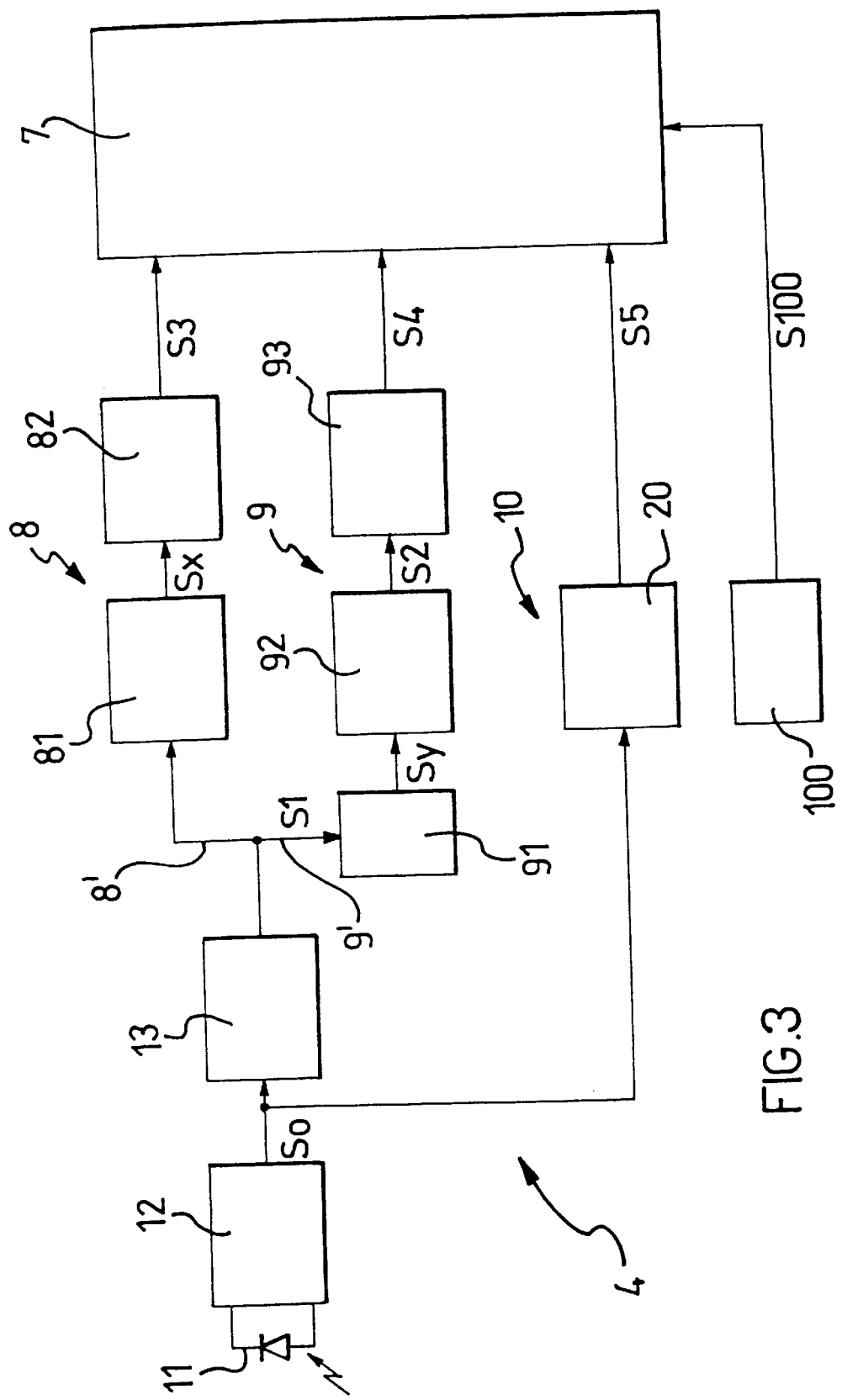
Figure 4:
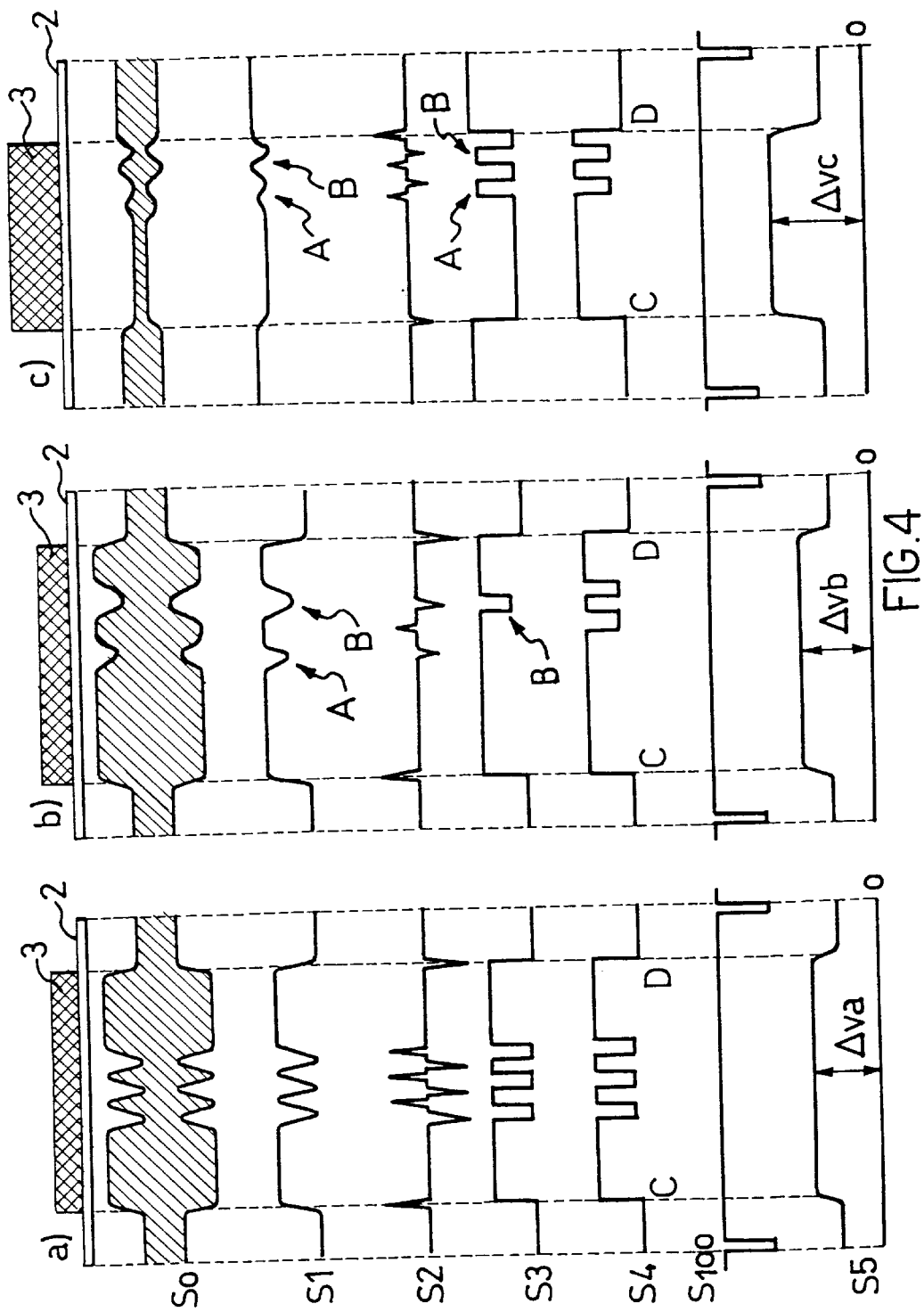
Figure 5:
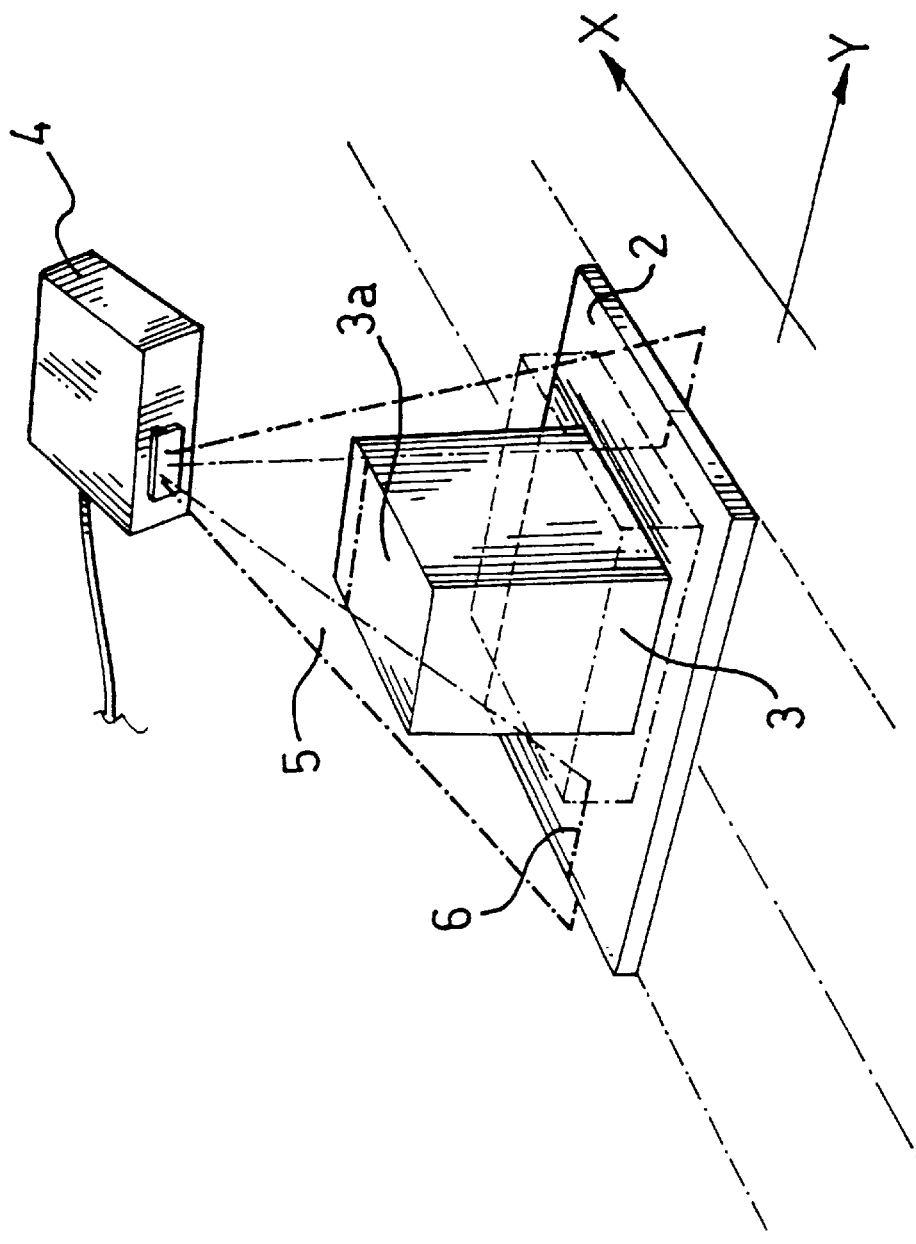
Figure 6:
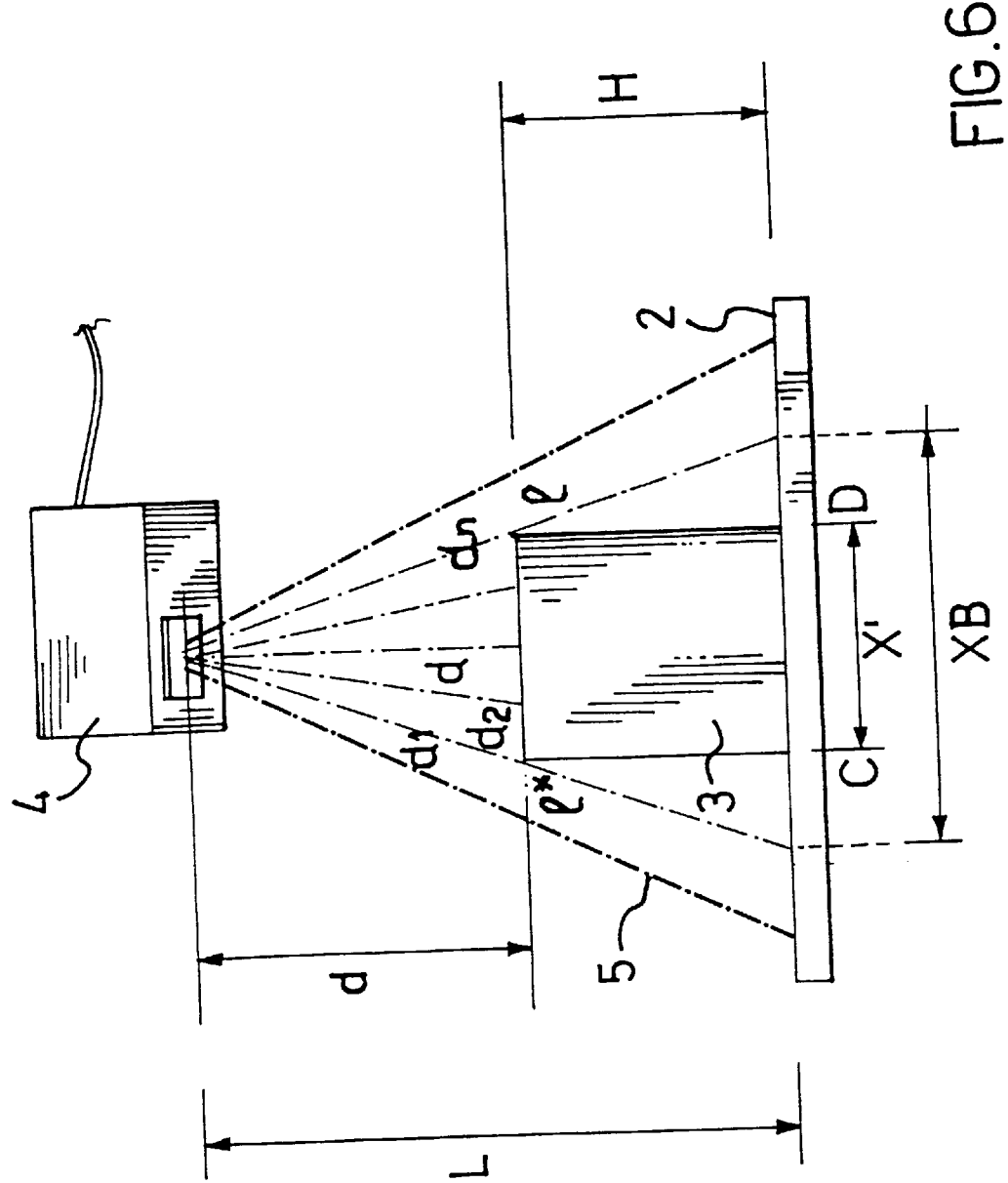

Further characteristics and advantages of the present invention will be apparent, from the following detailed description of one of the preferred embodiments, made with reference to the accompanying drawings. In such drawings, FIG. 1 is a schematic perspective view of an apparatus of the present invention, FIG. 2 is a schematic lateral view of the apparatus of FIG. 1, FIG. 3 shows a layout of functional blocks of the scanner of the apparatus of FIG. 1, FIG. 4 shows a processing layout of three different signals obtained from a scanning carried out by the scanner of the apparatus of FIG. 1, FIG. 5 is a schematic perspective view of the apparatus of FIG. 1 in a particular working configuration, FIG. 6 is a schematic frontal view of the apparatus in the configuration of FIG. 5.

Figure 2:
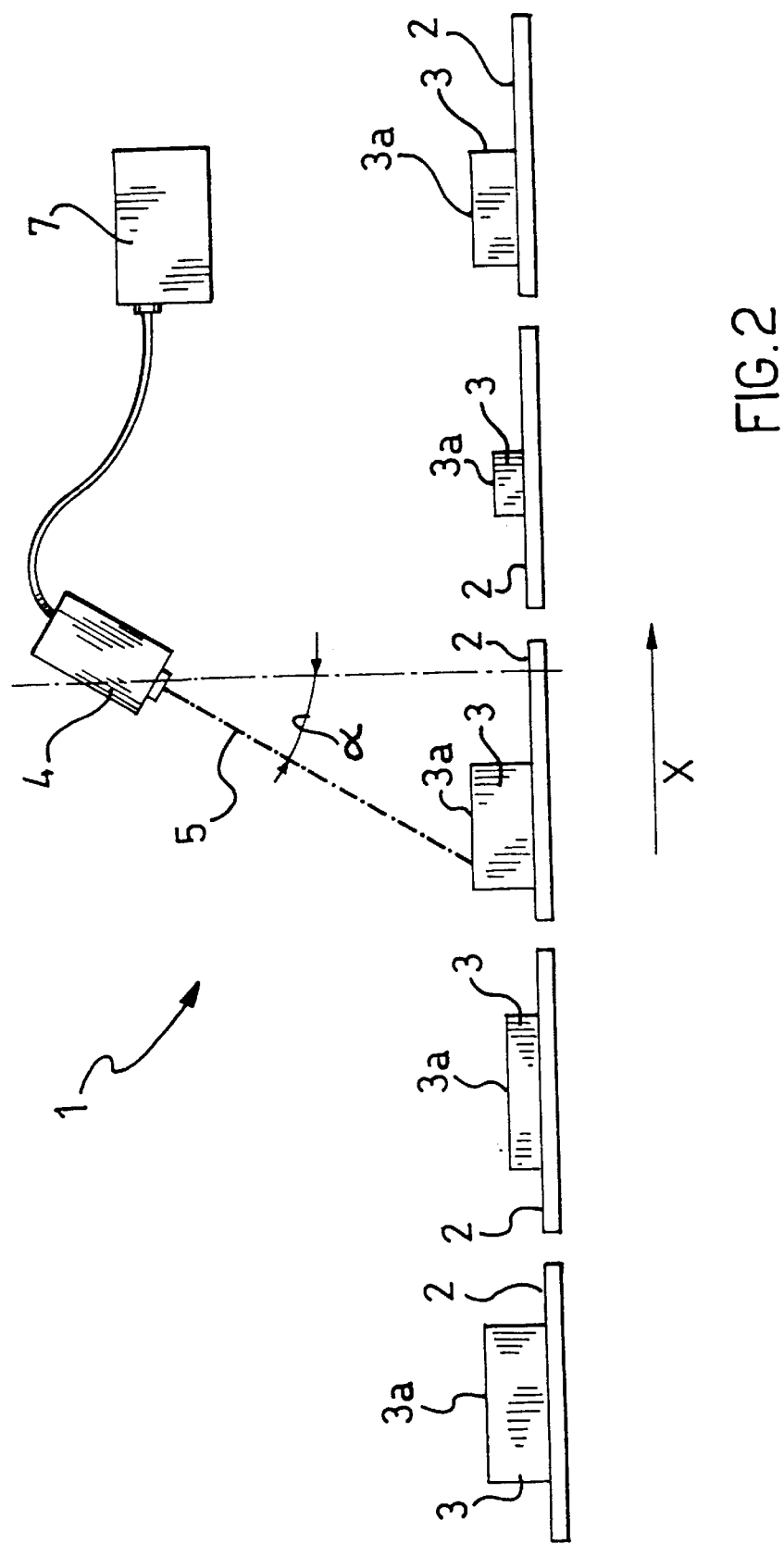

In FIGS. 1 and 2, an apparatus 1 is shown for detecting the presence and encumbrance of an object, to which apparatus 1a substantially horizontal supply plane x-y is associated. The apparatus 1 comprises, on the supply plane x-y, a bearing surface 2 for the objects 3 of which one wishes to detect the presence, the position and eventually the overall encumbrance.

The objects 3 show detection surfaces 3a which, at least in the border areas, have a different coloration with respect to that of the bearing surface 2.

The bearing surface 2 preferably consists of a plurality of trays, also indicated with 2, or, alternatively, of a continuous conveyor belt. Such bearing surface 2 is mobile according to a feed direction x, through the use of known handling means not shown.

The apparatus 1 comprises a laser scanner 4 placed above the supply plane x-y. The scanner 4 is provided with a laser ray that sweeps a scan plane 5 intersecting the supply plane x-y along a scan line 6. The scan plane 5 is inclined at an α angle with respect to the perpendicular to the supply plane x-y. Such angle α can even be zero.

In FIG. 3 an outline is shown of the functional blocks present in the scanner 4 in the case where the latter is predisposed not only for detecting the presence and the position of objects 3 on the supply plane, but also for calculating the encumbrance of same. In this case it concerns a modulated light laser scanner (as for example that described in U.S. Pat. No. 5,403,051 by the same applicant) in which, further blocks suitable to perform the above mentioned operations are added to the circuit blocks typically present in such type of scanner. The scanner 4 of FIG. 3 comprises therefore means 8 capable of reading an optical code positioned on the detection surface 3a of the objects 3, means 9 capable of detecting the luminous contrast between the detection surface 3a of the objects 3 and the bearing surface 2 of the supply plane x-y and means 10 capable of measuring the distance of every object 3 from the scanner 4.

The scanner 4 is connected moreover to a processing unit 7 of signals obtained from the scanning of the object 3. Such a unit 7 can even be included in the same scanner 4.

The means 8, 9 and 10 comprise circuit elements and software which are independent among them and these therefore can be used independently to implement a given scanner in a way to make it suitable for carrying out further operations with respect to those for which it is predisposed. This means that the scanner 4 can be a simple laser scanner for the reading of optical codes (and therefore comprising the means 8), to which the means 9 are added, or vice versa, or it can be a modulated light laser scanner (comprising therefore the means 10) to which means 8 and 9 are added etc.

The means 8 for the reading of optical codes comprise respectively a first amplifier 81, suitable for generating a signal $S_x$, and a digitizer 82, connected in series with the amplifier 81 and suitable to generate a digital signal $S_3$ which is sent to the data processing unit 7.

The means 9 for the detection of the luminous contrast, are connected in parallel to the means 8 and comprise a second amplifier 91, suitable for generating a signal $S_y$, connected to a derivative mean 92 suitable for generating a signal $S_2$. The derivative means 92 is then connected with squaring means 93, suitable for generating a digital signal $S_4$ which is sent to the data processing unit 7. The derivative means 92 and the squaring means 93 can be implemented, for example, through the amplifier operations and gauges.

The fundamental difference between the circuit elements of the means 9 and those of the means 8, dedicated to the reading of bar codes, is due to circuit parameters, such as for example a passing band, amplification levels, threshold criteria and signal/noise ratio. Such parameters in fact are not compatible to effectively deal at the same time both with the reading of the optical code and with the recognition of the beginning and end of the object 3 along the scan.

Typically in fact, in a scanner of 500 scans per second (a speed which is more than sufficient for such applications), the passing band of the amplifier 81 extends from DC up to approximately 1 MHz, while the amplifier 91 usually has a passing band of approximately 100 KHz, the dimensions of the objects 3 to be recognized being much greater that the dimensions of the bars and of the spaces of the optical codes and the dimensions of eventual spots present on the surfaces of the same objects.

As a result of the smaller width of the band, the signal/noise ratio of the signal $S_y$ is typically greater than that of the signal $S_x$, therefore being able to be squared with much easier criteria (and at times even through a simple comparison with a fixed threshold) in order to obtain information representing the beginning and the end of the object 3.

Such parameters are a function of the distance of work and scan speed of the laser ray etc., and based on these, they should be sized.

Upstream means 8 and 9, the scanner 4 comprises a photodiode 11, able to generate, through appropriate optic systems of a known type and not shown, an electrical signal (generally an electrical current) proportionate to the received amount of light. To the photodiode 11 are connected in series respectively an amplifier 12 and a amplitude demodulator 13. From the amplifier 12 an electric signal $S_o$ is issued (generally a tension), while from the amplitude demodulator 13 a signal $S_1$ is issued which is then sent to two different channels 8', 9' which operate in parallel and comprise respectively the means 8 and the means 9. To the amplifier 12 are further connected the means 10 for the measurement of the distance, comprising in particular a phase demodulator 20. Such means generate a signal $S_5$ which is then sent to the data processing unit 7.

Finally, a scan generator 100, itself well-known, is connected to the data processing unit 7, and is capable of generating a scan signal $S_{100}$ which then is processed for identifying the beginning and end points of the bearing surface 2 along a direction substantially perpendicular to the feed direction x (in particular, the beginning and end points of the scan line 6 on the bearing surface 2).

The supply plane is provided with an encoder (not shown), namely a device capable of sending a signal to the processing unit 7 every time that the bearing surface 2 is moved exactly at a pre-set feed distance.

The operation of the apparatus 1 takes place in the following way. The objects 3, of which one wishes to detect the presence, the position and eventually the overall encumbrance, are placed on the bearing surface 2 of the supply plane x-y. The continuous movement of said bearing surface in the feed direction x, brings each object 3 to reach a scanning area identified near the scanner 4.

The reaching of such area is signalled in such a way (for example through a signal generated from an entrance detector) to the processing unit 7, which activates the scanner 4, which sweeps the scan plane 5 with the laser ray. Alternatively, the scanner 4 is always in operation, in this way being able to detect the arrival of an object 3 to the scanning area.

Each time that the bearing surface 2, and therefore the object 3, have made a movement equal to the pre-set feed distance, the encoder sends a signal to the processing unit 7. At each signal sent to the encoder, the processing unit 7 carries out a sampling, in fact the scanner 4, once activated, continuously scans the object 3, but the processing unit 7 memorizes only the n values of the scan corresponding to the signal from the encoder.

When the object 3 intersects, during its movement, the scan plane 5, the processing unit 7, following the signal transmitted from the encoder, carries out a sampling. Such sampling can be targeted to the reading of the optical code positioned on the bearing surface 3a of the object 3, to the detection of the presence and/or the position of the object 3 on the bearing surface 2, and/or to the calculation of the overall encumbrance of the same object 3.

Let us consider the case in which the scanner 4 is a modulated light laser scanner, capable therefore of carrying out all the operations mentioned above.

The diffused light from the scan line covered by the laser ray is collected by the photodiode 11, which generates an electric current proportionate to the quantity of light received. Said electric current is amplified and transformed in voltage by means of the amplifier 12. The signal $S_o$ thus obtained, modulated at high frequency, results in being further modulated in amplitude from the various situations of different contrast which the laser ray encounters in its sweeping in the scan plane S.

The $S_o$ signal is demodulated by the amplitude demodulator 13, obtaining a signal $S_1$ which is sent to the means 8 for the reading of optical codes and to the means 9 for the detection of the luminous contrast between the detection surface 3a of the object 3 and the bearing surface 2 of the supply plane.

The decoding of the optical code through the means 8 is realized in a way which in itself is conventional and which, in order to simplify, is not repeated in this context.

Moreover, comparing the carrier issued with the carrier received, as indicated in the U.S. Pat. No. 5,483,051 mentioned above, a tension ΔV is obtained, through the phase demodulator 20, varying in time and proportionate, in each istant, to the distance of the n points of the detection surface 3a of the object 3 hit by the laser ray during the scanning. The signal $S_5$ thus obtained is then sent to the data processing unit 7 for the measurement of the distance of said points.

The calculation of the distance, by means of the modulated light laser scanner of, is carried out in the way indicated in the U.S. Pat. No. 5,483,051 mentioned above and which, in order to simplify, is not repeated in this context.

The detection of the presence and the position of the object 3 on the bearing surface 2 is instead carried out through the means 9. In particular, the derivative 92, after amplification of the signal $S_1$ obtained through the amplifier 91, generates the analogic signal $S_2$ (see FIG. 4), which represents fast transitions which correspond with the areas of contrast (that is of variations of reflections or reflectivity) which the laser ray encounters during the sweeping of the scan plane 5. During said sweeping, the laser ray hit in fact a plurality of points pertaining to the bearing surface 2 and a plurality of points of the detection surface 3a of the object 3. As already mentioned, in the border area, the object 3 and the bearing surface 2 have a different coloration, and therefore a different reflection. The presence and the position of the object 3 may be univocally determined from the identification of the area of the bearing surface 2 where a luminous contrast is detected with reference to the beginning and end of the scanning (see scan signal $S_{100}$ in FIG. 4).

The signal $S_2$ is sent to the squaring stage 93 which generates in the end the signal $S_4$, which represents in digital form the detected contrast. Said signal $S_4$ is sent to the data processing unit 7 for obtaining the information representing the beginning and end of the object 3 detected as a function of the scan signal $S_{100}$.

In order to guarantee an accurate operation, the bearing surf ace 2 should be preferably uniform in a way as not to show areas of luminous contrast in its interior. Such a situation is achieved for example by manufacturing said surfaces 2 with materials of uniform coloration.

Areas showing luminous contrast inevitably present on the detection surfaces 3a of the object 3 (as for example those caused by the presence of a bar code or an area of diverse colour) involve further transitions of signal $S_4$ which in any case do not invalidate the operation of detection of the presence and the position of the object 3 on the bearing surface 2. The correct interpretation of the detected luminous contrasts is in fact carried out from the data processing unit 7 through appropriate software optimized respectively for the recognition of the luminous contrast between the bearing surface 2 and the object 3 and for the reading of optical codes.

FIG. 4 shows an example of processing of three different signals obtained in the case in which on the scan line 6 is present: a) an object 3 having a height represented by ΔVa and holding, on the surface of detection 3a, a bar code, b) an object 3 having a height represented by ΔVb, with further areas of contrast on its surface of detection (represented by peaks A and B) and with a higher reflection than that of the bearing surface 2, c) an object 3 having a height represented by ΔVc greater than that of example b), even such object 3 having further areas of contrast on its detection surface 3a, which however, this time, has lower reflection than that of the bearing surface 2.

The data processing unit 7, through appropriate algorithms, has the task to interpret the signals $S_4$ of examples a), b) and c) in a way to obtain, along the scan line 6, the presence and the position of the points C and D, corresponding respectively to the first transition, relative to the beginning point of the object 3 and to the last transition, relative to the end point of the object 3, in the scan line 6. In particular, the processing unit 7 is capable of recognizing that the transitions between C and D represent: in the case a) an optical code, while in the cases b) and c) impure signals to be filtered. This is possible thanks to the fact that, as already mentioned, the bar codes show transitions having number, frequency and precise dimensions and are therefore easily identified.

In the case where one wishes only to detect the presence and the position of the object 3 on the bearing surface 2, the signal $S_4$, thus obtained, is capable of responding to such requirements. Further processing is therefore not necessary.

The signal of measurement of the distance $S_5$ becomes rather important in the case where it is necessary to calculate the overall encumbrance of the object 3 and/or its exact position, when the object is of substantial height.

This in consideration of the fact that, as showed in FIGS. 5 and 6, objects having different dimensions may provide the same image to the scanner 4. In fact, FIG. 6 shows how an object 3 of height H and transverse dimension x', provides to the scanner 4 an image $x_B$ different from the true dimension x'. The same is verified for all the objects 3 of different heights with edges laid down aligned along the same axis 1–1* belonging to the scan plane 5.

The processing unit 7 of a normal scanner would therefore not be able to recognize if the image $x_B$ detected pertains to a low and wide object or to a tall and narrow object.

In such case, by the data processing unit 7, further operations are necessary in order to provide the necessary information. In particular, it is important to measure the distance of the object 3 from the scanner 4.

With reference to FIG. 6, one assumes that the scanner 4 is positioned at a distance L from the bearing surface 2 of the supply plane x-y and that it is perpendicular to said plane. An object 3 of height H, showing a detection surface 3a having sufficient contrast with respect to the bearing surface 2, has a transverse dimension x' obtainable as:

$$x'=(x_B*d)/L$$

where d is the minimum distance from points $d_1, d_2 \ldots d_n$ measured from the scanner 4 during the sweeping of the laser ray on the detection surface 3a and $x_B$ is the measurement of the image of the object 3 seen from the scanner 4 at a distance L.

Measuring therefore for every object 3 its distance from the scanner 4, it is possible to calculate univocally for each object the true transverse dimension and therefore, detecting its exact position on the bearing surface 2.

Determining the exact position of the object 3 through the above quoted formula results in being particularly reliable. In the case in fact of low objects, the distance d tends to L and therefore the true dimension x' tends to $x_B$, and that is to the image of the object 3 seen from a normal scanner, without detection of the distance. In the case of tall objects, the measurement of the distance d results in being very precise and consequently also that of x' (and therefore the determination of the exact position of the object 3).

By moving the object 3 from a pre-set feed distance (this fact is signalled by the encoder, which determines thus a new sampling) it is possible to calculate an elementary area of the detection surface 3a. Using the data from the new sampling and repeating the operation of calculating the elementary area mentioned above for all subsequent sections of the object 3, it is finally possible to calculate the overall area of detection surface 3a of the object 3 as the sum of the single elementary areas calculated.

Such measurement is therefore correct in function of height H of the object 3 given the signal $S_5$.

In the case in which the scanner 4 was tilted at an angle α with respect to the perpendicular to the supply plane x-y (see FIGS. 1, 2 and 5), the calculations remain the same on the condition of substituting measurement L with G* cos α, where G is the measurement of the distance of the bearing surface 2 from the scanner 4.

The measurement L can be obtained automatically from the scanner 4 in the installation step, acquiring the measurement of the distance of a reference sample (of thickness close to zero and known width) supported on the bearing surface 2. Similarly, $x_B$ can be obtained through comparison with the measurement of the width of the same sample.

What is claimed is:

1. Apparatus for detecting the presence and the position of an object moving according to a feed direction on the bearing surface of a supply plane (x-y), characterized in that it comprises:
    a laser scanner (4), placed above the supply plane (x-y) and activated in a scan plane (5) intersecting the supply plane (x-y) along a scan line (6),
    a data processing unit (7) connected to the scanner (4), the scanner (4), in turn, comprising means (9) for detecting the luminous contrast between a detection surface (3a) of the object (3) and the bearing surface (2) of the supply plane (x-y).

2. Apparatus in accordance with claim 1, comprising further:
    means to send to the processing unit (7) a signal every time that the object (3) is moved on the supply plane (x-y) at a pre-set feed distance.

3. Apparatus in accordance with claim 1 wherein the scanner (4) is a modulated light laser scanner of comprising means for the measurement of the distance between the scanner (4) and the object (3).

4. Apparatus in accordance with claim 1, wherein the scanner (4) is a scanner for the reading of an optical code positioned on the detection surface (3a) of the object (3).

5. Process for detecting the presence and the position of an eventual object on a supply plane, comprising the following steps:
    a) defining a bearing surface (2) for the object (3) associated with the supply plane (x-y),
    b) defining a feed direction x of the object (3) on the supply plane (x-y),
    c) defining a scan plane (5) intersecting the supply plane (x-y) along the scan line (6),
    d) sweeping the scan plane (5) with a laser ray from a laser scanner (4),
    e) moving the object (3) on the supply plane (x-y) n the feed direction x with respect to the scan plane (5) until the scan line (6) intersects the object (3) in its detection surface (3a),
    f) acquiring the data from at least one scanning of the object (3),
    g) processing the data obtained from said scanning thus detecting the luminous contrast between the detection surface (3a) of the object (3) and the bearing surface (2).

6. Process in accordance with claim 5, wherein the step g) comprises, in turn, the following steps:
    g1) generating a scan signal (S100), thus identifying the beginning and end points of the scan line (6) on the bearing surface (2),
    g2) detecting a first transition (C), corresponding with the object's (3) beginning point,
    g3) detecting a last transition (D), corresponding with the object's (3) end point,
    g4) determining the position of the object (3) on the bearing surface (2) calculating the distance between, respectively, the first transition (C) and the last transition (D) and the scan signal (S100).

7. Process in accordance with claim 5, wherein the step of processing the data obtained comprises further the following steps:
    amplifying the electric signal obtained from the scan,
    taking the derivative of the amplified signal,
    squaring the derivative signal in order to obtain a digital signal,
    processing, through an appropriate software, the digital signal.

8. Process for detecting the exact position of an object on a supply plane, comprising the following steps:
    a) placing the object (3) to be detected on a bearing surface (2) associated with the supply plane (x-y),
    b) defining a feed direction x of the object (3) on the supply plane (x-y),
    c) defining a scan plane (5) intersecting the supply plane (x-y) along a scan line (6),
    d) sweeping the scan plane (5) with a laser ray from a modulated light laser scanner (4),
    e) moving the object (3) on the supply plane (x-y) in the feed direction x with respect to the scan plane (5) until the scan line (6) intersects the object (3) in its detection surface (3a),
    f) acquiring the data from at least one scanning of the object (3),
    g) processing the data obtained from said scanning in order to:
        g1) detect the luminous contrast between the detection surface (3a) of the object (3) and the bearing surface (2) of the supply plane (x-y),
        g2) measure the distance from the scanner (4) of n points of the detection surface (3a) hit by the modulated light laser ray,
        g3) select the minimum distance between the n measured distances,
        g4) calculate, based on said minimum distance, a transverse dimension, with respect to the feed direction x, of the object (3).

9. Process in accordance with claim 8, wherein the calculation of the transverse dimension of the object (3) is carried out through the following formula:

$$x' = (x_B * d)/L$$

where:
    d is the minimum distance between the n measured distances, $x_B$ is the measurement of the image of the object (3) seen from the scanner (4) at distance L.

10. Process for detecting the encumbrance of an object on a supply plane, comprising the following steps:
   a) placing the object (3) to be detected on a bearing surface (2) associated with the supply plane (x-y),
   b) defining a feed direction x of the object (3) on the supply plane (x-y),
   c) defining a scan plane (5) intersecting the supply plane (x-y) along the scan line (6),
   d) sweeping the scan plane (5) with a laser ray from a modulated light laser scanner (4),
   e) moving the object (3) on the supply plane (x-y) in the feed direction x with respect to the scan plane (5) until the scan line (6) intersects the object (3) in its detection surface (3a),
   f) acquiring the data from at least one scanning of the object (3),
   g) processing the data obtained from said scanning in order to:
      g1) detect the luminous contrast between the detection surface (3a) of the object (3) and the bearing surface (2) of the supply plane (x-y),
      g2) calculate a transverse dimension, with respect to the feed direction x, of the object (3),
      g3) move the object (3) with respect to the scan plane (5) at a pre-set feed distance in the feed direction x on the supply plane (x-y),
      g4) calculate, for every transverse dimension, an elementary area of the detection surface (3a) of the object (3) as product of the calculated transverse dimension for the movement carried out,
      g5) repeat the steps from e) to g4), until a luminous contrast is detected between the detection surface (3a) of the object (3) and the bearing surface (2) of the supply plane (x-y),
      g6) calculate the area of the detection surface (3a) of the object (3) as the sum of the calculated elementary areas.

11. Process in accordance with claim 10, comprising further the following steps:
   g2i) measuring the distance from the scanner (4) of n points of the detection surface (3a) hit by the modulated light laser ray,
   g2ii) selecting the minimum distance between the n measured distances,
   g2iii) calculating, based on said minimum distance, a transverse dimension, with respect to the feed direction x, of the object (3).

12. Process in accordance with claim 11, wherein the calculation of the transverse dimension of the object (3) is carried out through the following formula:

$$x' = (x_B * d)/L$$

where:

d is the minimum distance between the n measured distances, $x_B$ is the measurement of the image of the object (3) seen from the scanner (4) at distance L.

13. Process in accordance with claim 10, comprising further the step of reading an optical code positioned on the detection surface (3a) of the object (3).

14. Process in accordance with claim 5, comprising further the step of reading an optical code positioned on the detection surface of the object.

* * * * *